(12) United States Patent
Kind

(10) Patent No.: US 8,311,132 B2
(45) Date of Patent: Nov. 13, 2012

(54) PILOT-ASSISTED DOPPLER FREQUENCY ESTIMATION

(75) Inventor: Adriel P. Kind, North Ryde (AU)

(73) Assignee: Agere Systems Inc., Allentown, PA (US)

( * ) Notice: Subject to any disclaimer, the term of this patent is extended or adjusted under 35 U.S.C. 154(b) by 1566 days.

(21) Appl. No.: 11/289,943

(22) Filed: Nov. 30, 2005

(65) Prior Publication Data

US 2007/0121739 A1    May 31, 2007

(51) Int. Cl.
*H04K 1/10*     (2006.01)
*H04L 27/28*    (2006.01)

(52) U.S. Cl. .................. 375/260; 375/268; 375/296

(58) Field of Classification Search ............ 375/259, 375/260, 267, 299, 316, 347, 344, 342
See application file for complete search history.

(56) References Cited

U.S. PATENT DOCUMENTS

| | | | | |
|---|---|---|---|---|
| 5,563,604 | A * | 10/1996 | Brandao et al. | 342/159 |
| 5,640,431 | A * | 6/1997 | Bruckert et al. | 375/344 |
| 6,028,549 | A | 2/2000 | Buckreuss et al. | 342/159 |
| 6,519,300 | B1 * | 2/2003 | Ramesh | 375/344 |
| 6,826,240 | B1 * | 11/2004 | Thomas et al. | 375/340 |
| 6,856,649 | B2 * | 2/2005 | Birru | 375/233 |
| 7,418,046 | B2 * | 8/2008 | Gore et al. | 375/260 |
| 2002/0067307 | A1 * | 6/2002 | Lin et al. | 342/357.12 |
| 2006/0198454 | A1 * | 9/2006 | Chung et al. | 375/260 |
| 2009/0027257 | A1 * | 1/2009 | Arikan et al. | 342/159 |

FOREIGN PATENT DOCUMENTS

| | | |
|---|---|---|
| EP | 0 762 666 A2 | 3/1997 |
| EP | 1 513 309 A1 | 3/2005 |

OTHER PUBLICATIONS

"Level Crossing Rate in Terms of the Characteristic Function: A New Approach for Calculating the Fading Rate in Diversity Systems," by Ail Abdi and Mostafa Kaveh, date unknown.
"Velocity Adaptive Handoff Algorithms for Microcellular Systems," by Mark D. Austin and Gordon L. Stüber, IEEE Transactions on Vehicular Technology, vol. 40, No. 3, Aug. 1994, pp. 549-561.

(Continued)

*Primary Examiner* — Kenneth Lam
*Assistant Examiner* — Qutbuddin Ghulamali
(74) *Attorney, Agent, or Firm* — Mendelsohn, Drucker & Associates, P.C.; Kevin M. Drucker; Steve Mendelsohn

(57) ABSTRACT

A technique for estimating the Doppler frequency of an input signal comprising a pilot signal. In one embodiment, the technique comprises: (a) accumulating a plurality of samples from the input signal over a specified time duration to derive a channel tap estimate; (b) obtaining a sequence of channel tap estimates by repeating step (a) until a specified number of channel tap estimates have been accumulated; (c) performing a Fourier transform of the sequence of channel tap estimates to obtain a complex sequence of values; (d) finding the smallest index value for which a power spectral distribution function of the complex sequence of values exceeds a specified threshold; and (e) obtaining an estimate of the Doppler frequency by dividing the smallest index value found in step (d) by the product of the specified number of channel tap estimates and the specified time duration.

23 Claims, 2 Drawing Sheets

OTHER PUBLICATIONS

"Adaptive Averaging Methodology for Handoffs in Cellular Systems," by Jack M. Holtzman and Ashwin Sampath, IEEE Transactions on Vehicular Technology, vol. 46, No. 1, Feb. 1995, pp. 59-66.

"Speed Estimation in Wireless Systems Using Wavelets," by Ravi Narasimhan and Donald C. Fox, IEEE Transactions on Communications, vol. 47, No. 9, Sep. 1999, pp. 1357-1364.

"Estimation of Doppler spread and signal strength in mobile communications with applications to handoff and adaptive transmission," by Cihan Tepedelenlioglu et al., Wireless Communications and Mobile Computing, 2001, 1: pp. 221-242.

* cited by examiner

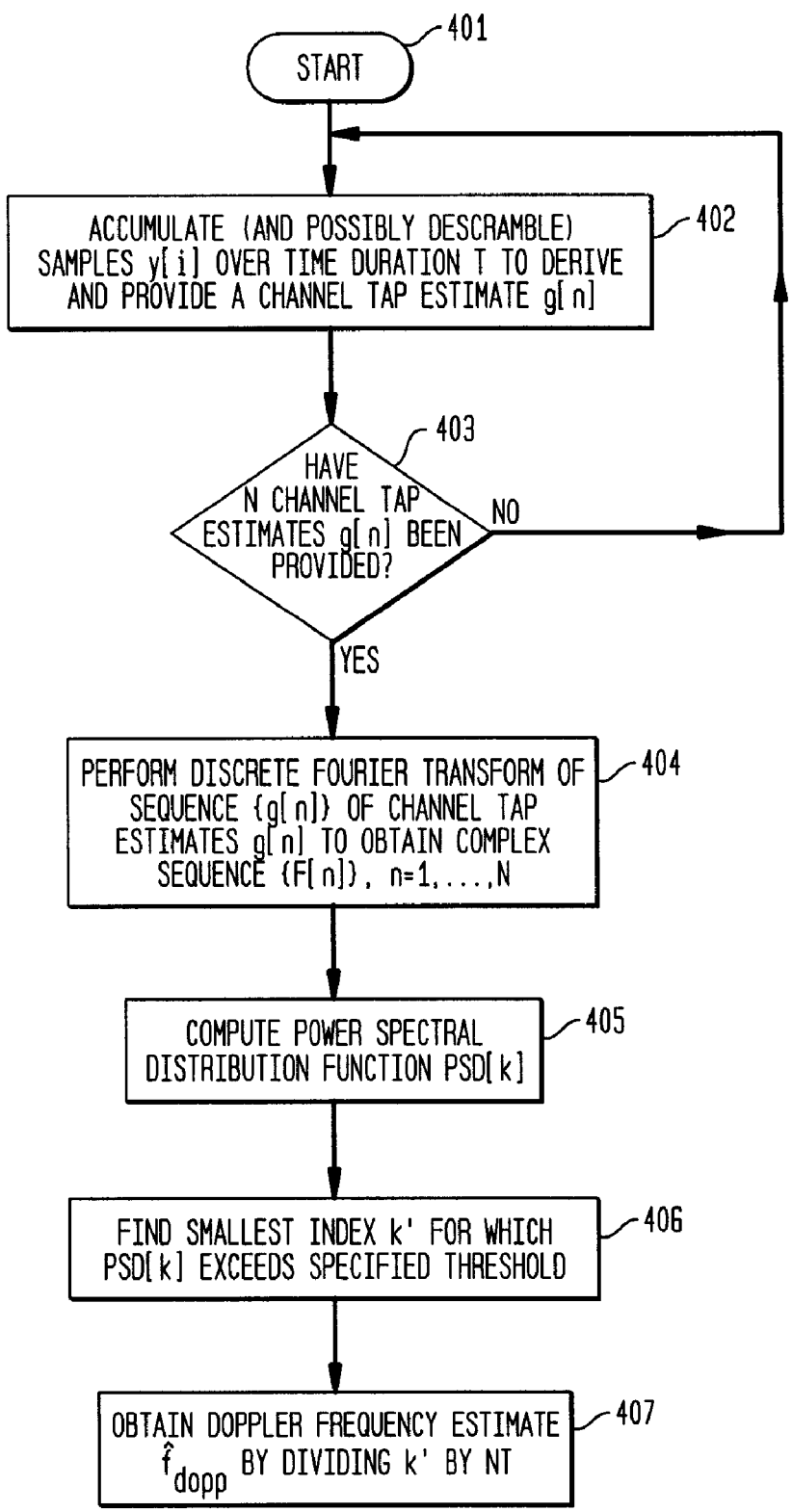

PILOT-ASSISTED DOPPLER FREQUENCY ESTIMATION

BACKGROUND OF THE INVENTION

1. Field of the Invention

The present invention relates generally to Doppler-frequency tracking, and more particularly, to the tracking of frequency shift due to the Doppler effect in mobile communications systems.

2. Description of the Related Art

Communication systems operating in the mobile environment are subject to a continuously changing channel. The rate of change of the channel depends primarily on the relative velocities of the transmitter, receiver, and reflective objects in the environment. When the channel changes over time, the signal bandwidth is increased by the Doppler frequency, or Doppler bandwidth.

Consequently, optimizing receiver performance involves knowledge or estimation of various parameters, e.g., received signal phase, amplitude, and noise level, which depend on the channel as the channel changes over time. Various techniques for estimating such parameters are known in the art, many of which employ filtering in order to remove out-of-band noise from the estimation data. The filter bandwidth is typically set to reject energy at frequencies greater than the Doppler frequency while retaining all energy within the Doppler bandwidth, to prevent the loss of useful information. Thus, the Doppler frequency is tracked as it changes over time, so that relevant filter parameters may be updated accordingly.

One traditional approach to Doppler-frequency estimation involves the use of covariance methods, which utilize measured estimates of the channel state, along with various assumptions about the statistics of the channel process to derive estimators of Doppler frequency. Another approach involves the use of level-crossing rate methods, which use channel state measurements to determine the rate at which the channel level crosses a given envelope power level. The crossing rate is then used along with estimators, again derived using assumptions on the channel process, to estimate the Doppler frequency.

The foregoing approaches to Doppler-frequency estimation tend to be computationally complex and difficult to implement, often using transcendental functions that may be unsuitable for hardware. These approaches also tend to lead to relatively inaccurate estimates, resulting in poor receiver performance, particularly at low signal-to-noise ratios. Moreover, these methods are designed to work in channels having specific statistical properties, which may be over-simplified and poor models of real-world channels.

SUMMARY OF THE INVENTION

Problems in the prior art are addressed in accordance with the principles of the present invention by exploiting an embedded pilot signal to estimate Doppler frequency. A pilot signal is a signal, usually a single frequency, which is transmitted over a communications system for supervisory, control, equalization, continuity, synchronization, or reference purposes.

In one embodiment, the present invention provides a method for estimating the Doppler frequency of an input signal comprising a pilot signal. The method includes: (a) accumulating a plurality of samples from the input signal over a specified time duration to derive a channel tap estimate; (b) obtaining a sequence of channel tap estimates by repeating step (a) until a specified number of channel tap estimates have been accumulated; (c) performing a Fourier transform of the sequence of channel tap estimates to obtain a complex sequence of values; (d) finding the smallest index value for which a power spectral distribution function of the complex sequence of values exceeds a specified threshold; and (e) obtaining an estimate of the Doppler frequency by dividing the smallest index value found in step (d) by the product of the specified number of channel tap estimates and the specified time duration.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 is a flowchart showing the steps of an exemplary method consistent with one embodiment of the present invention.

DETAILED DESCRIPTION

Figure 1:
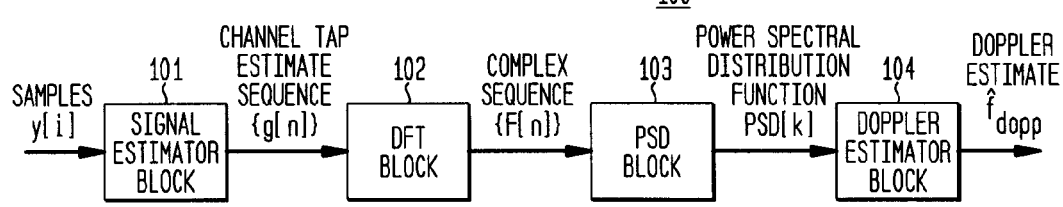
FIG. 1 is a block diagram illustrating an exemplary signal processing chain consistent with one embodiment of the present invention.

With reference now to FIG. 1, an exemplary signal processing chain 100 consistent with one embodiment of the present invention is illustrated. As shown, signal processing chain 100 comprises a signal estimator block 101, a discrete Fourier transform (DFT) block 102, a power spectral distribution (PSD) block 103, and a Doppler estimator block 104. The input signal has embedded therein a pilot signal, which is typically used in the estimation of parameters, such as noise variance, signal power, and/or the rotation of the channel, the knowledge of which may be needed to process the input signal properly. In this embodiment of the present invention, the properties of this pilot signal are defined by the Third-Generation Partnership Project (3GPP) standard, which are specifications for a mobile telephone and data communications system that is applicable worldwide. Doppler estimation will be performed using this embedded pilot signal.

A radio receiver (not shown) receives an analog input signal, which includes the pilot signal. The complex analog input signal is converted into complex input samples in digital form by an analog-to-digital converter (not shown). A plurality of complex input samples y (which are typically the same complex input samples used concurrently by other circuitry that demodulates data from the complex input samples) are received by signal estimator block 101 and de-scrambled and accumulated over an accumulation period. The accumulation period has a duration T, which is determined by the maximum possible Doppler frequency that is to be measured. In particular, an accumulation interval of T seconds will allow estimation of Doppler frequencies up to $1/(2T)$ Hz. The descrambler timing is adjusted to match the timing of a primary ray from a base station generating and transmitting, using a plurality of multi-path rays, one or more signals containing the samples. In this exemplary embodiment, the accumulation period of 2 milliseconds coincidentally happens to correspond to the transmit time interval (TTI) in the High-Speed Downlink Packet Access (HSDPA) standard for high-speed data transfer, which is a methodology employed in the 3GPP standard to support the increasing use of mobile data services, including enhanced data transfer rates. Taking one sample per HSDPA chip interval corresponds to the accumulation of 7680 samples over a single accumulation period (and a single TTI) and allows Doppler estimation up to 250 Hz. While it is desirable for the primary ray generated at the base station to be used for setting the descrambler timing, it should be recognized that other rays could be used in alternative embodiments of the present invention.

Although complex input samples y may be accumulated without being despread or descrambled in certain embodiments of the present invention, in any real-world application in which a spread and scrambled pilot signal is present, complex input samples y will be despread and descrambled before being accumulated. The accumulation of a large number of complex input samples y tends to average out the effects of noise even in very poor channels, although fewer complex input samples y could be accumulated if a less-accurate result can be tolerated. In the following example, the pilot-to-noise power ratio is −10 dB, and the total signal-to-noise ratio is 0 dB. If the accumulation of complex input samples y over one accumulation period is considered as a single time-domain sample of the channel state, a sequence of such complex input samples y forms an ergodic complex process which may be used to estimate Doppler frequency. Taking one sample per chip, signal estimator block 101 performs the descramble/accumulate operation as shown in the following Equation (1):

$$g[n] = \sum_{i=K(n-1)+1}^{Kn} c^*_{scram}[i]y[i], \quad (1)$$
$$n = 1, \ldots, N,$$

where * denotes the complex conjugate operation used to descramble the sample, y[i] is a complex number representing an input sample received at a chip rate of $1/T_{chip}$, $c_{scram}$ represents the scrambling code generated at a chip rate of $1/T_{chip}$, g[n] represents a channel tap estimate received at a chip rate of $1/T_{TTI}$, and K is a constant representing the number of samples taken over a single accumulation period (in this example, K=7680). Thus, at each accumulation period boundary, signal estimator block 101 calculates and provides one value of g[n], which is stored for subsequent processing.

More generally, signal g[n] is an estimate of the channel amplitude, measured over a duration of T seconds, of a particular tap (e.g., 0, T, 2T, 3T, etc.). Signal estimator block 101 provides a channel tap estimate g[n] every T seconds. Signal estimator block 101 described herein is relatively accurate but merely exemplary, and it should be understood that any type of channel tap estimator could alternatively be used. Measurement duration T has the following constraint: If $\hat{f}_{dopp,max}$ is the highest Doppler frequency to be measured, then the following Inequality (2) holds true:

$$T \le \frac{1}{2\hat{f}_{dopp,max}}. \quad (2)$$

In other words, as the measurement duration T becomes longer, the range of Doppler frequencies that can be measured decreases. In the foregoing example, the selected value of $T=T_{TTI}=0.002$ seconds, which permits measurement of frequencies up to 250 Hz. Signal estimator block 101 continues providing channel tap estimates g[n] until N channel tap estimates have been provided, resulting in a sequence {g[n]} of channel tap estimates. The presence of the pilot signal facilitates an efficient and accurate way of obtaining g[n] (i.e., by descrambling and despreading). If the pilot signal were not present, channel estimates g[n] could still be obtained, but g[n] could not be obtained accurately enough for the remaining steps of the algorithm to function properly.

Next, DFT block 102 performs (e.g., using a software algorithm) a discrete Fourier transform (DFT) of the sequence {g[n]} to obtain a complex sequence {F[n]}, n=1, . . . , N. A particular value of N allows estimation to a precision of 1/NT Hz, and creates a delay of NT seconds, but does not affect the maximum measurable frequency of 1/(2T) Hz. Alternatively, a fast Fourier transform (FFT) or similar algorithm could be used to obtain sequence {F[n]}.

The value of N is a design parameter. Increasing the value of N allows better resolution in DFT 102 and more accurate results, since more channel tap estimates in sequence {g[n]} are available. The tradeoff is that increasing N also increases the delay suffered before a Doppler estimate can be obtained. N is desirably selected to be an integer power of 2 to allow efficient implementation of the discrete Fourier transform.

Next, PSD block 103 uses complex sequence {F[n]} to generate and provide a sequence of values representing a power spectral distribution function {PSD[k]}, k=1, . . . , N/2+1, which is defined recursively by the following Equation (3):

$$PSD[k] = \quad (3)$$
$$\begin{cases} |F[1]|^2/Z, & k = 1, \\ (|F[k]|^2 + |F[N-k+2]|^2)/2Z + PSD[k-1], & 1 < k \le N/2, \\ |F[N/2+1]|^2/Z + PSD[N/2], & k = N/2+1, \end{cases}$$

where Z is a constant such that PSD[N/2+1]=1.

It should be noted that sequence {F[n]} consists of N complex values, while sequence {PSD[k]} consists of N/2+1 real values.

Next, Doppler estimator 104 finds the smallest index k' for which PSD[k] exceeds a specified threshold. Doppler estimator 104 obtains the frequency estimate $\hat{f}_{dopp}$ by dividing k' by NT, as given in the following Equation (4):

$$\hat{f}_{dopp} = \frac{k'}{NT}, \quad (4)$$

where T is the duration of the accumulation period in seconds. The estimator is intentionally slightly biased towards an overestimate, particularly for small N, since overestimating the Doppler frequency has less of a negative impact on receiver performance than underestimating the Doppler frequency. It should be recognized that index values other than the smallest index value could be used in other embodiments.

Figure 2:
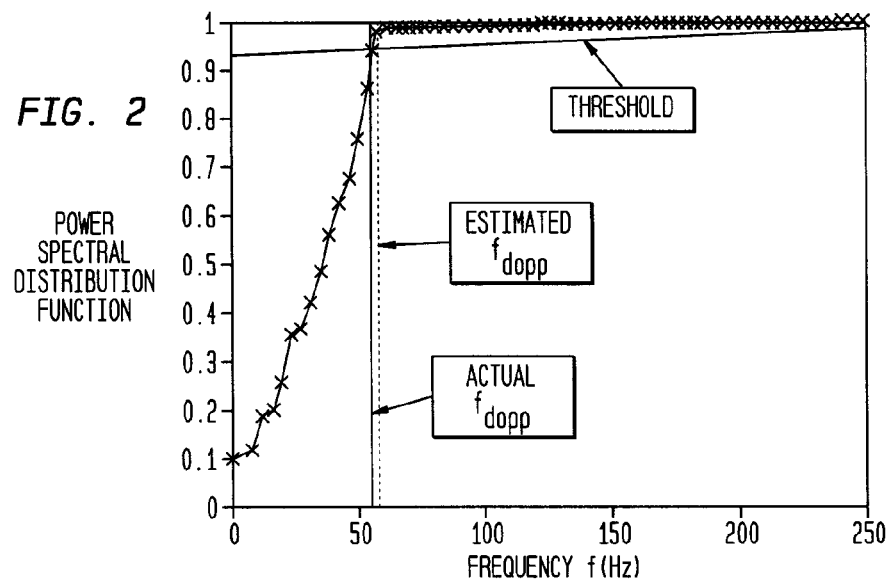
FIG. 2 graphically illustrates a power spectral distribution function with measured and actual Doppler frequencies in an exemplary simulation of the signal processing chain of FIG. 1.

Turning now to FIG. 2, a graph shows the measured PSD function as a function of frequency for an exemplary simulation with $\hat{f}_{dopp}$=55.6 Hz, using N=128 samples, as well as the estimate $\hat{f}_{dopp}$ obtained using the method, for the ITU vehicular A channel at velocity 30 kilometers per hour. The linear threshold shown in the figure was set heuristically and appears to give excellent results in the 3GPP scenario, as evidenced by graph BA. The curve in FIG. 2 marked with crosses represents the function {PSD[k]} for k=1, ..., N/2+1, with N/2+1=65. The mathematical value k and actual frequency f is given by the following Equation (5):

$$f = \frac{k-1}{NT}. \quad (5)$$

To determine the maximum Doppler frequency, the present invention teaches finding the value of k (and hence f) below which all or nearly all of the signal energy lies. While the threshold can be arbitrarily set, it has been found that setting the threshold between 93-98% tends to give accurate results. The particular threshold used in the example and shown in FIG. 2 is described as a function of frequency according to the following Equation (6):

$$\text{threshold}(f) = 0.93 + 0.1 fT \quad (6)$$
$$= 0.93 + 0.1 \frac{k-1}{N}.$$

Figure 3:
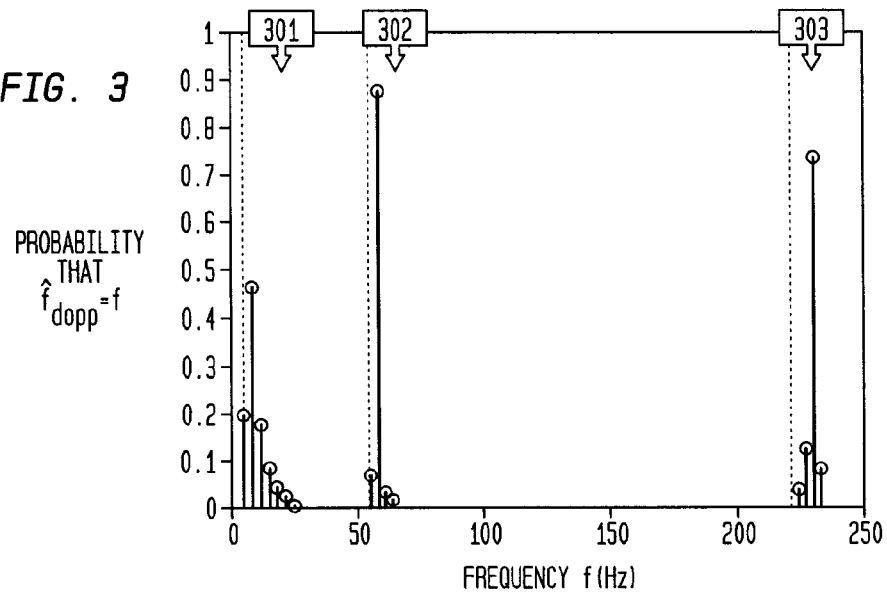
FIG. 3 graphically illustrates three histograms of estimated Doppler frequencies along with actual Doppler frequencies for various channels in an exemplary simulation of the signal processing chain of FIG. 1.

With reference now to FIG. 3, three histograms 301, 302, 303 are shown representing measured Doppler frequencies for N=128, each measured over 2,000 TTI's, in an exemplary simulation. Each histogram show the proportion of estimates falling at a particular frequency. The actual Doppler frequencies (represented by dashed lines) are 5.56, 55.6, and 222.2 Hz, corresponding to relative velocities of 3, 30, and 120 kilometers per hour, respectively. The slowest channel is ITU pedestrian-B, while the other two channels are both ITU vehicular-A. The plot shows the relatively good performance and accuracy of Doppler estimator 104.

Turning now to FIG. 4, a flowchart 400 shows the steps of an exemplary method consistent with one embodiment of the present invention. The method begins at step 401. At step 402, samples y[i] are repeatedly accumulated (and possibly descrambled) over time duration T to derive and provide a channel tap estimate g[n]. At step 403, a determination is made whether N channel tap estimates have been provided, in which case the method proceeds to step 404. If, at step 403, it is determined that N channel tap estimates have not been provided, then the method returns to step 402 to accumulate further samples y[i] and derive a further channel tap estimate g[n]. At step 404, a discrete Fourier transform of sequence {g[n]} of channel tap estimates g[n] is performed to obtain the complex sequence {F[n]}, n=1, ..., N. At step 405, the power spectral distribution function PSD[k] is computed. At step 406, the smallest index k' for which PSD[k] exceeds a specified threshold is found. At step 407, the frequency estimate $\hat{f}_{dopp}$ is obtained by dividing k' by NT. Following the completion of step 407, the method may or may not return to step 402 to repeat steps 402 through 407 over one or more subsequent time periods T.

Thus, the present invention provides a method for estimating Doppler frequency that is more accurate than prior art techniques and is relatively simple to implement, robust, and computationally efficient.

While the present invention is described in the context of a communications system, it should be recognized that the invention may have utility in any application involving measurement of the speed that two objects are moving relative to one other, e.g., radar systems.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

I claim:

1. A method of estimating the Doppler frequency of an input signal comprising a pilot signal, the method comprising:
    (a) accumulating a plurality of samples from the input signal over a specified time duration to derive a channel tap estimate;
    (b) obtaining a sequence of channel tap estimates by repeating step (a) until a specified number of channel tap estimates have been accumulated;
    (c) performing a Fourier transform of the sequence of channel tap estimates to obtain a complex sequence of values;
    (d) finding an index value for which a power spectral distribution function of the complex sequence of values exceeds a specified threshold; and
    (e) obtaining an estimate of the Doppler frequency by dividing the index value found in step (d) by the product of the specified number of channel tap estimates and the specified time duration.

2. The invention of claim 1, further comprising descrambling the plurality of samples.

3. The invention of claim 2, wherein the accumulating and descrambling steps are performed using equation $$g[n] = \sum_{i=K(n-1)+1}^{Kn} c_{scram}^*[i]y[i], n = 1, \ldots, N;$$

wherein:
g[n] represents the $n^{th}$ channel tap estimate;
N represents the specified number of channel tap estimates;
* denotes a complex conjugate operation;
y[i] is a complex number representing an $i^{th}$ input sample;
K represents total number of samples received over the specified time duration; and
$c_{scram}[i]$ represents a scrambling code for the $i^{th}$ input sample.

4. The invention of claim 1, wherein the Fourier transform is a discrete Fourier transform.

5. The invention of claim 1, wherein the specified time duration corresponds to an accumulation of 7680 samples.

6. The invention of claim 1, wherein the specified time duration is less than or equal to $$\frac{1}{2\hat{f}_{dopp,max}},$$

wherein $\hat{f}_{dopp,max}$ represents a maximum Doppler frequency.

7. The invention of claim 1, wherein the specified number of channel tap estimates is an integer power of 2.

8. The invention of claim 1, wherein the power spectral distribution function PSD[k] is defined recursively by $$PSD[k] = \begin{cases} |F[1]|^2/Z, & k = 1, \\ (|F[k]|^2 + |F[N-k+2]|^2)/2Z + PSD[k-1], & 1 < k \le N/2, \\ |F[N/2+1]|^2/Z + PSD[N/2], & k = N/2+1, \end{cases}$$

where Z is a constant such that PSD[N/2+1]=1, and F[ ] is a Fourier transform function.

9. The invention of claim 1, wherein the specified threshold is defined as $$\text{threshold}(f) = A + B\left(\frac{k-1}{N}\right).$$

10. The invention of claim 9, wherein A=0.93 and B=0.1.

11. The invention of claim 1, wherein the specified threshold is between approximately 93% and 98%.

12. The invention of claim 1, wherein the index value found in step (d) is the smallest index value.

13. The invention of claim 1, wherein the index value correlates with a frequency below which nearly all of the signal energy from a remote transmitter lies.

14. Apparatus for estimating the Doppler frequency of an input signal comprising a pilot signal, the apparatus comprising:
a signal estimator block adapted to (a) accumulate a plurality of samples from the input signal over a specified time duration to derive a channel tap estimate, and (b) obtain a sequence of channel tap estimates by repeating step (a) until a specified number of channel tap estimates have been accumulated;
a Fourier transform block adapted to perform a Fourier transform of the sequence of channel tap estimates to obtain a complex sequence of values;
a power spectral distribution block adapted to find an index value for which a power spectral distribution function of the complex sequence of values exceeds a specified threshold; and
a Doppler estimation block adapted to obtain an estimate of the Doppler frequency by dividing the index value found by the power spectral distribution block by the product of the specified number of channel tap estimates and the specified time duration.

15. The invention of claim 14, wherein the signal estimator block is further adapted to descramble the plurality of samples.

16. The invention of claim 15, wherein the signal estimator block is adapted to perform the accumulating and descrambling operations using equation $$g[n] = \sum_{i=K(n-1)+1}^{Kn} c_{scram}^*[i]y[i], n = 1, \ldots, N;$$

wherein:
g[n] represents the $n^{th}$ channel tap estimate;
N represents the specified number of channel tap estimates;
* denotes a complex conjugate operation;
y[i] is a complex number representing an $i^{th}$ input sample;
K represents total number of samples received over the specified time duration; and
$c_{scram}[i]$ represents a scrambling code for the $i^{th}$ input sample.

17. The invention of claim 14, wherein the specified time duration is less than or equal to $$\frac{1}{2\hat{f}_{dopp,max}},$$

wherein $\hat{f}_{dopp,max}$ represents a maximum Doppler frequency.

18. The invention of claim 14, wherein the power spectral distribution function PSD[k] is defined recursively by $$PSD[k] = \begin{cases} |F[1]|^2/Z, & k = 1, \\ (|F[k]|^2 + |F[N-k+2]|^2)/2Z + PSD[k-1], & 1 < k \le N/2, \\ |F[N/2+1]|^2/Z + PSD[N/2], & k = N/2+1, \end{cases}$$

where Z is a constant such that PSD[N/2 +1]=1, and F[ ] is a Fourier transform function.

19. The invention of claim 14, wherein the specified threshold is defined as $$\text{threshold}(f) = .093 + .01\left(\frac{k-1}{N}\right).$$

20. The invention of claim 14, wherein the index value found in step (d) is the smallest index value.

21. The invention of claim 14, wherein the index value correlates with a frequency below which nearly all of the signal energy from a remote transmitter lies.

22. A machine-readable storage medium, having encoded thereon program code, wherein, when the program code is executed by a machine, the machine implements a method for estimating the Doppler frequency of an input signal, the method comprising:
- (a) accumulating a plurality of samples from the input signal over a specified time duration to derive a channel tap estimate;
- (b) obtaining a sequence of channel tap estimates by repeating step (a) until a specified number of channel tap estimates have been accumulated;
- (c) performing a Fourier transform of the sequence of channel tap estimates to obtain a complex sequence of values;
- (d) finding an index value for which a power spectral distribution function of the complex sequence of values exceeds a specified threshold; and
- (e) obtaining an estimate of the Doppler frequency by dividing the index value found in step (d) by the product of the specified number of channel tap estimates and the specified time duration.

23. The invention of claim 22, wherein the index value correlates with a frequency below which nearly all of the signal energy from a remote transmitter lies.

* * * * *